May 28, 1968   E. PLUMAT ETAL   3,385,686

DEVICE FOR THE WORKING OF PASTY FUSION PRODUCTS

Filed Oct. 8, 1964

INVENTORS
EMILE PLUMAT
MARCEL DUPERROY
BY
*John J. Hart*
ATTORNEY

United States Patent Office 3,385,686
Patented May 28, 1968

3,385,686
DEVICE FOR THE WORKING OF PASTY FUSION PRODUCTS
Emile Plumat, Gilly, and Marcel Duperroy, Jumet, Belgium, assignors to Glaverbel, Brussels, Belgium, a Belgian company
Filed Oct. 8, 1964, Ser. No. 402,451
Claims priority, application Luxembourg, Oct. 19, 1963, 44,661
4 Claims. (Cl. 65—335)

ABSTRACT OF THE DISCLOSURE

Apparatus composed of a chamber for melting pasty fusion products and a refining basin connected thereto by a conduit having its entry end located above a depressed bottom portion of such chamber, the latter having an area which is defined by inclined side wall portions and increases upwardly toward the conduit entry end, and burner nozzles having their discharge ends injecting hot gases through such inclined side wall portions.

The invention

The present invention relates to a process and a device for the working of pasty fusion products, such as glass. In the said process, in known manner, the starting materials encounter as they descend flows of ascending hot gases blown into the substances which are in a state of fusion. The furnaces utilised for this purpose comprise a fusion zone prolonged upwardly by a heat exchanging column through which the starting materials are introduced. The hot gases are injected into the starting materials contained in the fusion zone through nozzles opening out in the vertical walls thereof or through its horizontal wall in the lower part of the zone. After having heated the said substances, the gases ascend the exchanged column where they give off their heat to the raw materials which drop in counter-flow from the upper portion of the said column where they are introduced. Although these furnaces yield excellent results, it has been found that it is nevertheless possible to improve their operation.

According to the invention, the hot gases are injected below the fused materials in a zone which widens out upwardly. Introducing the gases into a zone the dimensions of which are relatively small, a considerable agitation of the fused materials is achieved. Furthermore, by widening the said zone in the upward direction, the agitation of the materials is prevented from being transmitted integrally as far as the surface, the consequence of which would be to cause considerable projection of molten substances.

Preferably, the hot gases are injected laterally into the upwardly widening zone. In this way, it becomes possible to prevent the formation, in the mass of molten substances, of calm zones which as is known tend to form mainly in the marginal regions.

Advantageously, the hot gases are directed towards the central portion of the molten materials. The gases thus set up, in the said materials, flows travelling from the marginal regions towards the central portion and urging the materials present in the heart of the mass towards the lateral zones. Furthermore, since the said flows converge towards each other, they are mixed with each other and ensure improved homogenisation of the products undergoing processing.

The invention relates also to a device comprising a chamber adapted to contain the molten substances, nozzles for blowing hot gases into the said chamber, a conduit for conveying the molten products to a refining basin and a tank surmounting the said chamber and serving for the introduction of the raw materials from above and for the evacuation of the hot gases coming from below. According to the invention, the nozzles open out below the chamber in a portion thereof which is below the conduit, delimited by inclined walls and widening upwardly.

Advantageously, the portion of the chamber which widens upwardly comprises two opposite vertical walls and two opposite walls inclined towards each other and forming the end face of the chamber. This is an embodiment which can be carried into effect in an especially simple manner. Furthermore, since the chamber widens progressively in the upward direction, the volume of the materials in a state of fusion is diminished and due to this, the agitation produced in the heart thereof by the in-blown hot gases is more regular.

The angle between the inclined walls is preferably between 80 and 120°. The smaller value is more suitable from the viewpoint of agitation of the molten materials, this being of greater magnitude and more uniform. On the other hand, if a higher value is selected, the average level of the eddies in the tank is reduced and the projection of material is also diminished.

The conduit for the evacuation of the fused products is connected to a wall forming, in the upwardly widening chamber, either a vertical wall or an inclined wall. With this arrangement, the molten products are taken off in a relatively calm zone and consequently any possibility of insufficiently processed substances being projected into the evacuation conduit is prevented.

The nozzles for the injection of the hot gases advantageously open out in the inclined walls of the upwardly widening chamber. Consequently, the blown-in gases do not tend to ascend along the walls and the wear of the latter is less than that shown to take place in cases wherein the nozzles open out in the vertical walls. One of the nozzles is preferably disposed on the side of the inlet of the evacuation conduit and another near the side of the opposite wall.

The accompanying drawings show, by way of example, a plurality of embodiments of the invention.

Figure 1:
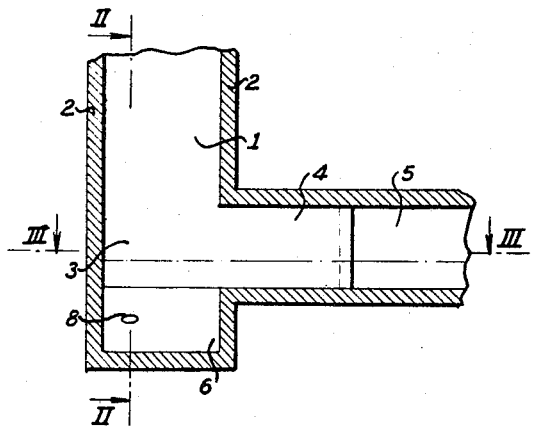
FIGURE 1 shows, in vertical section, a device according to the invention.
Figure 2:
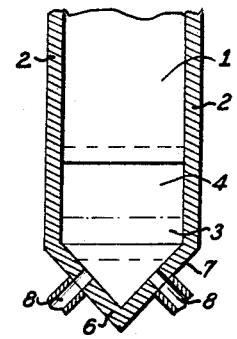
FIGURE 2 is a section taken along the line II—II of FIGURE 1.
Figure 3:
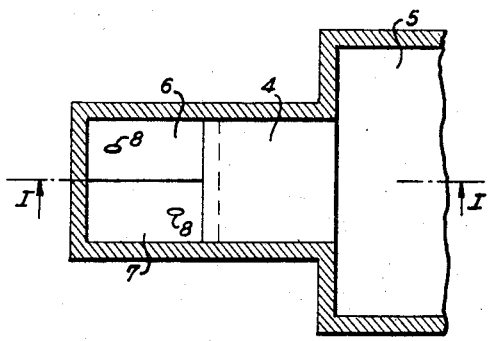
FIGURE 3 is a section taken along the line III—III of FIGURE 1.
Figure 4:
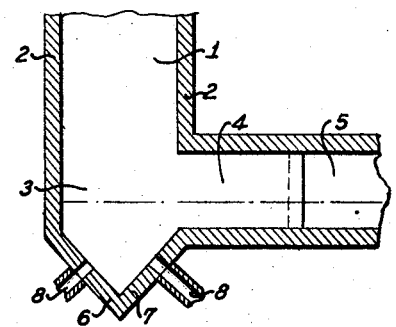
FIGURE 4 shows a further embodiment of the device.

The device constitutes a furnace wherein a column 1, preferably consisting of four lateral walls 2 made of heat-refractory material terminates below in a fusion chamber 3. The latter is connected by an evacuation conduit 4 to a refining basin 5. The bottom of the fusion chamber is below the evacuation conduit and comprises two inclined walls 6 and 7 forming between them an angle of between 80 and 120°. The vertical plane extending through the intersection of the two inclined walls is located in the median plane of the conduit and of the refining basin in the embodiment according to FIGURES 1 to 3 and perpendicular to the said median plane in the embodiment according to FIGURE 4. Each inclined wall has extending through it, substantially perpendicularly, an injection nozzle 8. The two nozzles are offset relatively to each other, one being disposed near the side of the conduit and the other near the side of the vertical wall opposite the conduit. It would of course be possible to provide more than two injection nozzles, in principle distributed as described hereinabove.

In the two embodiments, the raw materials are introduced at the top of the column 1, by a device which is not shown. They drop in the form of a "shower" and are collected as a fused mass in the chamber 3. The nozzles 8 inject hot gases, for example gases in the state of combustion, into the molten materials which they heat and intimately mix. Then, the gases ascend in the column where they give off their residual heat to the raw materials dropping down therein. They are finally evacuated through a conduit (not shown) connecting the upper portion of the column to a flue.

The molten materials contained in the chamber 3 are evacuated through the conduit 4 towards the refining basin 5 from which they are removed for shaping.

The injection nozzles disposed as described hereinabove co-operate in the setting up in the chamber 3 of a gyratory movement facilitating the mixing of the materials. Furthermore, the nozzle disposed near the conduit sets up a flow blocking the inlet of the latter and preventing insufficiently processed materials from being accidentally projected into it.

Of course, the invention is not limited to the embodiments described and illustrated by way of example and the scope of the invention would not be exceeded if modifications were to be made.

We claim:

1. Apparatus for the processing of pasty fusion products such as glass, comprising a fusion chamber (3) for receiving the materials to be melted, a refining basin (5) spaced from said fusion chamber (3), conduit means (4) between said chamber (3) and basin (5) adapted to receive into its entry end the material melted in said fusion chamber (3) and to conduct such melted material to said refining basin (5), said fusion chamber (3) having a depressed bottom portion located below the flow level of said conduit means (4) and having side walls defining an area for holding the molten material in sufficient volume to enable the creation of moving currents in such material, and including inclined side wall portions (6, 7) increasing such area upwardly toward said entry end of said conduit means (4), and nozzles (8) for injecting hot gases into the material contained in said depressed bottom portion (of 3), the discharge ends of said nozzles (8) being located in such inclined side wall portions (6, 7) below the level of the molten material in said depressed bottom portion and below the entry end of said conduit so that the hot gases injected thereby create moving currents in the molten material tending to minimize calm zones in the latter and to homogenize the molten material flowing into said conduit means (4).

2. Apparatus as defined in claim 1, in which said inclined side wall portions (6, 7) are disposed in opposed, angular, upwardly flaring relation.

3. Apparatus as defined in claim 2, in which said inclined side wall portions (6, 7) are arranged in the form of a V to form a V-shaped depressed bottom portion below the entry end of said conduit means (4).

4. Apparatus as defined in claim 1, in which one of said injection nozzles (8) is located in one inclined side wall portion (7) and adjacent to the entry end of said conduit means (4), and in which another injection nozzle (8) is located in another inclined side wall portion (6) and spaced further from said conduit entry end than said one injection nozzle.

References Cited

UNITED STATES PATENTS

| 1,953,023 | 3/1934 | Mulholland | 65—135 |
| 1,991,331 | 2/1935 | Morton | 65—342 |
| 2,246,375 | 6/1941 | Lyle | 65—335 X |
| 3,260,587 | 7/1966 | Dolf et al. | 65—335 X |

DONALL H. SYLVESTER, *Primary Examiner.*

S. LEON BASHORE, *Examiner.*

F. W. MIGA, *Assistant Examiner.*